March 26, 1940.  C. T. DENKER  2,194,694
HEATING SYSTEM
Filed April 4, 1939  3 Sheets-Sheet 1
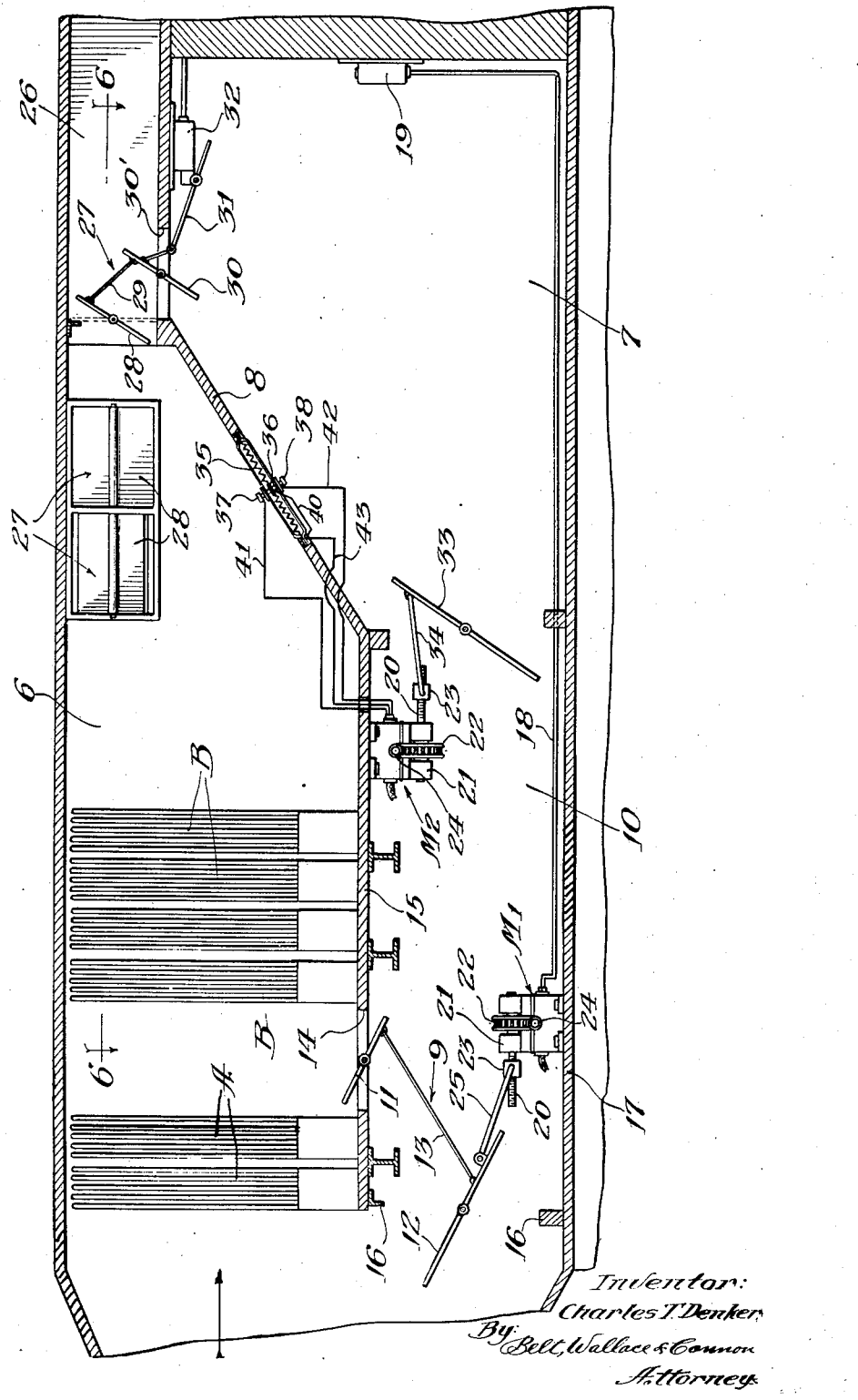
Inventor:
Charles T. Denker
By Belt, Wallace & Connor
Attorney March 26, 1940.  C. T. DENKER  2,194,694
HEATING SYSTEM
Filed April 4, 1939  3 Sheets—Sheet 2
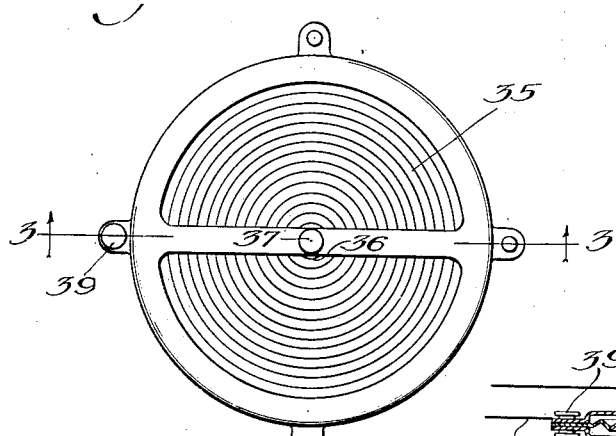
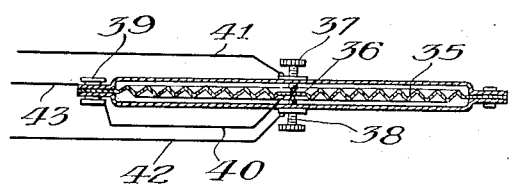
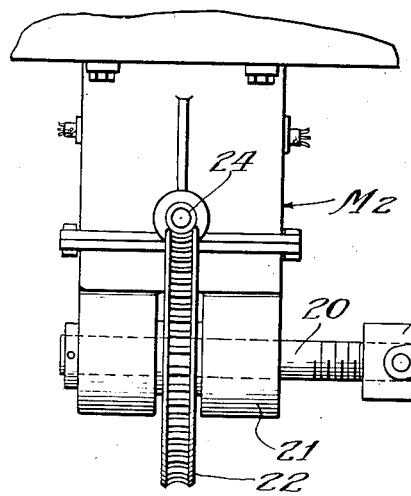
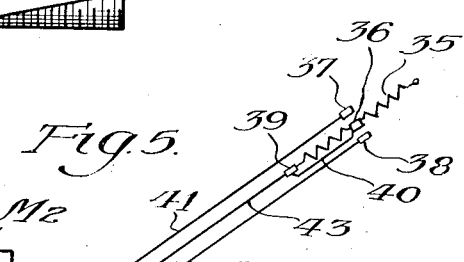
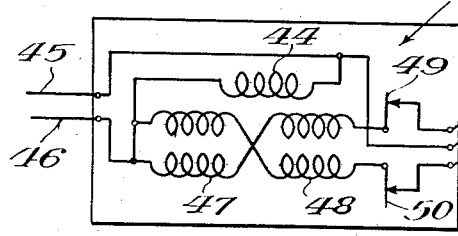
Inventor:
Charles T. Denker,
By Belt, Wallace & Cannon
Attorneys March 26, 1940.                C. T. DENKER                2,194,694
                                HEATING SYSTEM
                            Filed April 4, 1939           3 Sheets-Sheet 3

Fig. 6

Inventor:
Charles T. Denker,
By Belt, Wallace & Cannon
Attorneys

Patented Mar. 26, 1940

2,194,694

UNITED STATES PATENT OFFICE 2,194,694

HEATING SYSTEM

Charles T. Denker, Chicago, Ill.

Application April 4, 1939, Serial No. 265,989

6 Claims. (Cl. 237—2)

This invention relates to heating systems, particularly those in which a flow of heated air is produced at a pressure greater than atmospheric and is then directed to rooms or other areas to maintain them at a desired temperature or temperatures.

It has been the practice in such systems to provide what is known as a tempered air chamber adjacent the hot air chamber and to mix tempered air from such chamber with the air from the hot chamber, in proportions determined by the particular needs of the system, prior to admission of the air into the locations in which it is to be utilized. Air in the tempered air chamber is maintained in a cool or slightly heated condition, and usually a temperature responsive device is provided to regulate the temperature of the air within the chamber. Air from a pressure-producing means, such as a blower, is admitted to the tempered air chamber with little or no heat added; and generally the tempered air is at a pressure comparable to that of the air as it leaves the blower or like pressure-producing device. On the other hand, the air in the hot air chamber is first passed through a heating unit, and the loss in pressure head, due to the friction encountered in the heating unit, tends to reduce the pressure of the air in the hot chamber to a point considerably lower than that of the air in the tempered air chamber. Customarily, a mixing damper is provided in each duct through which air is directed from the hot air chamber to rooms or the like which are to be heated, such damper being controlled by a temperature responsive device located in the room or area with which the duct communicates and functioning to properly proportion the hot air with the tempered air to produce a mixture having the needed temperature.

The main difficulty encountered in such prior arrangements arises from the difference in pressure between air from the tempered air chamber and air from the hot air chamber, a noticeable change in the velocity of the air emitted from a duct into a room or the like being detected whenever the mixing damper is actuated to vary the relative proportions of air from the tempered and hot chambers in the duct. Thus, assuming that the room thermostat or like temperature regulating device has been set to maintain the temperature within a desired range of values and that the room temperature has risen above the upper limit in this range, the mixing damper will then be actuated to decrease the admission of hot air to the duct and increase the flow of tempered air thereinto in order to bring the room temperature down to normal. When this occurs and since the tempered air is admitted to the duct under a greater pressure than is the hot air, the velocity of the air mixture flowing from the duct will increase, and an uncomfortable draft may result from this increased velocity.

It is, therefore, an object of this invention to maintain the velocity of the air admitted to the rooms or like areas to affect the temperature therein at a substantially constant value and thereby avoid producing objectionable drafts and the like.

Another object is to equalize the air pressures in the hot and tempered air chambers of a heating system and thereby avoid variations in pressure when the relative proportions of air derived from such chambers are varied.

A further object is to automatically regulate the air pressure in the tempered air chamber of a heating system relative to the air pressure in the hot air chamber of such a system.

Still another object is to provide a novel damper arrangement for selectively restricting the flow of air into the tempered air chamber of an otherwise conventional heating and air circulating system, to thereby compensate for any loss in pressure head normally encountered by the air flowing into the hot air chamber as it flows through the banks of heating coils.

Still further objects are to provide a motor drive having a high mechanical advantage for actuating the aforesaid damper; to render such motor responsive to a predetermined difference in the air pressures within the hot and tempered air chambers by the provision of a suitable pressure-responsive device; and to provide for either forward or reverse movement of the motor and damper to thereby either increase or decrease the flow of air into the tempered air chamber in accordance with the pressure difference as detected by the pressure-responsive device.

Other and further objects of the present invention will be apparent from the following description and claims and are illustrated in the accompanying drawings which, by way of illustration, show a preferred embodiment and the principle thereof and what I now consider to be the best mode in which I have contemplated applying that principle. Other embodiments of the invention embodying the same or equivalent principle may be used, and structural changes may be made as desired by those skilled in the art without departing from the present invention and the purview of the appended claims.

In the drawings,

Fig. 1 is a vertical sectional view of a typical heating system embodying my invention;

Fig. 2 is a plan view of a diaphragm employed in my novel control means;

Fig. 3 is a sectional view taken along the line 3—3 on Fig. 2;

Fig. 4 is an elevation of a motor drive used in controlling certain of the dampers;

Fig. 5 is a wiring diagram of the damper control means; and

Fig. 6 is a sectional plan view taken substantially along the line 6—6 on Fig. 1, with portions of the partitions and walls broken away to show, with greater clarity, other parts of the structure.

In the illustrated embodiment of my invention there are a hot air chamber 6 (Fig. 1) and a tempered air chamber 7 that are separated by a partition 8. At the left-hand end of the hot air chamber 6, as viewed in Fig. 1, is a bank of pre-heating coils A and inwardly thereof is a bank of heating coils B, both of these banks of coils being mounted on a platform 15 that cooperates with the partition 8 to separate the chambers 6 and 7. Air from a blower or other source of air under pressure (not shown) flows from left to right through the system, as it is viewed in Fig. 1, that portion of the air which enters the hot chamber 6 being first passed through the heating coils A and B while that portion of the air that is to flow into the tempered air chamber 7 first flows through the intermediate chamber 10.

Air may flow into the chamber 10 through an opening 16 between the platform 15 and floor 17 and also through an opening 14 in the platform 15 between the heating coil banks A and B, an inlet damper, generally indicated by 9, controlling flow of air through these openings. The damper 9 is of the double-acting type and comprises two damper members 11 and 12 connected by a link 13. The member 11 controls flow through the opening 14 while the member 12 controls flow through the opening 16. When the damper member 11 is in open position, or partially open position, part of the air coming from the blower and passing through the preheating coils A is diverted into the chamber 10. Air also flows into the intermediate chamber 10, when the member 12 is in open position, or partially open position, through the opening 16. Air flowing past the member 11 is heated prior to entry thereof into the chamber 10, it having been warmed by passage over the preheating coils A. However, air admitted past the member 12 is unheated.

Operation of the damper 9 is effected by a motor $M_1$, which is preferably of the reversible damper control type. Conductors in the cable 18 electrically connect the motor $M_1$ with a suitable thermostatic control element 19 located in the tempered air chamber 7, so that the motor $M_1$ will be responsive to temperature changes in the chamber 7, but it is to be understood that this motor or the damper 9 could be controlled by pneumatic or other temperature responsive means. The shaft of the motor $M_1$ may be directly linked to the damper 9, but I prefer to interpose a speed-reducing arrangement similar to that illustrated in Fig. 4. Thus, a shaft 20, threaded for a portion of its length, is journaled in bearings as 21 on the motor frame and is driven by a worm wheel 22 that meshes with a worm 24 on the motor shaft. A nut 23 travels along the threaded portion of the shaft 20 and is connected by a link 25 to the damper 9. In this way I obtain a slow, smooth operation of the damper 9, thereby avoiding shock or hunting of the mechanical parts. Also, once it is moved into proper position, the damper 9 will be positively retained in such position due to the high mechanical advantage of the motor drive arrangement, until it is again removed by the motor, this being an advantageous feature where the air pressures on the damper are apt to be unbalanced. The operation of the damper 9 under control of the thermostatic element 19 maintains the temperature inside the chamber 7 at a substantially constant value with a minimum of damper movement especially because the damper is of the double-action type.

Air flowing from the hot air chamber 6 and the tempering chamber 7 is admitted into a series of ducts as 26, through which the air is distributed to points of use. Each duct 26 is provided with a mixing damper, generally indicated at 27, of the double-acting type. One damper member 28 controls the admission of hot air from the chamber 6 into the duct 26, and it is connected by a link 29 to the other damper member 30, which regulates the admission of tempered air from the chamber 7 into the duct 26. These damper members are complementary so that the total effective area of the openings between the duct 26 and the chambers 6 and 7, respectively, will be substantially constant irrespective of the particular positions of each of the members.

Each mixing damper as 27 is connected by a leverage 31 to a temperature-responsive device 32, that is responsive to the temperature in the room or area with which the duct 26 communicates, and each such control device is operable, through its leverage 31, to adjust the position of the connected damper 27 so as to maintain the temperature in the room or area within the desired range.

The arrangement of ducts 26 and dampers 27 is best shown in the plan view, Fig. 6. Openings 30' in the ducts 26 afford communication of the ducts 26 with the tempering chamber 7, these openings being selectively restricted by the damper members 30. The various mixing dampers 27 are operated independently of each other by the control devices 32, Fig. 1.

Each of the banks of heating coils A and B consists of a plurality of rows of steam tubes $b$ which are preferably arranged in staggered relation as shown in Fig. 6. The air is heated as it flows through the spaces between the tubes $b$, but in such flow it is subjected to substantial friction particularly because of the staggered relation of the tubes. Air flowing into the intermediate chamber 10 only encounters the friction of the pre-heating coils A whereas the air flowing into the chamber 6 encounters the friction of the coils A and also that of the heating coils B. As a result of this, the air in the hot chamber 6 will be at a pressure lower than the pressure of the air in the tempering chamber 7, with which the intermediate chamber 10 communicates, unless compensation for this condition is afforded.

To this end I provide a control damper 33 (Fig. 6) in the opening between the intermediate chamber 10 and the tempering chamber 7, Fig. 1. This damper is connected to a drive mechanism on the motor $M_2$ by a link 34. Motor $M_2$ is similar to the motor $M_1$ and is shown in detail in Fig. 4. Link 34 connects to a traveling nut 23 which is actuated by the motor $M_2$ in the manner explained hereinabove in connection with the motor $M_1$.

The control of motor M₂ is afforded by a pressure responsive device, as diaphragm 35, which is shown in plan in Fig. 2 and which is sealed in the partition 8 so as to be exposed on one side to the heated air in the hot chamber 6 and on the other side to the tempered air in the chamber 7. Through suitable electrical connections, presently to be described, the motor M₂ is placed directly under control of the diaphragm 35, and when the difference in pressures between the air in the chambers 6 and 7 reaches a predetermined limit, preferably not greater than one pound per square inch, the control damper 33 is swung either toward open or shut position, as the need may be, to either restrict or increase the effective area of the opening between the chamber 10 and the tempering chamber 7, thereby regulating the pressure of the air in the tempering chamber 7 relative to that of the air in the hot air chamber 6.

For example, if the pressure of the tempered air in the chamber 7 rises too high, the diaphragm 35 will cause the contact 36 on said diaphragm to engage the stationary contact 37. The movable contact 36 is connected by a wire 40 to a terminal 39, to which a conductor 43 is connected, and the stationary contact 37 is connected to a conductor 41. Unbalancing of the air pressures in the chambers 6 and 7 in the manner just described, therefore, will actuate the diaphragm 35 to close circuit from conductor 43 to conductor 41.

The motor M₂ is preferably a reversible damper control type alternating current motor. As shown diagrammatically in Fig. 5, the motor M₂ is equipped with a field coil 44 which is connected across the line wires 45 and 46 leading to the motor M₂. So long as the field coil 44 alone is energized the rotor of the motor will remain stationary, this serving as an electrical brake and operating to hold the damper 33 in any position in which it is set as a result of operating the motor M₂. The motor M₂ includes two shading coils 47 and 48. The shading coils operate in conjunction with the field coil to drive the motor and depending upon which of the shading coils 47 or 48 is energized, the motor M₂ will rotate in either a forward or reverse direction. It will be noted in Fig. 5 that the conductor 43 leading from the movable contact on the diaphragm 35 is connected to the line wire 45 and that the shading coils 47 and 48 are connected on one side to the stationary contacts 37 and 38, respectively, through conductors 41 and 42 and on the other side to the line wire 46.

When, therefore, the air pressures in the hot chamber 6 and the tempering chamber 7 become unbalanced so as to cause the diaphragm 35 to close circuit between conductor 43 and the conductor 41 as above described, the shading coil 47 will be energized, and the motor M₂ will be actuated to move the control damper 33 toward closed position, until a balance of air pressures has been restored in the chambers 6 and 7.

On the other hand, if the unbalance is the other way; i. e., if the pressure in the tempering chamber 7 is too low, the movable contact 36 on the diaphragm 35 will engage a stationary contact 38, thereby closing circuit between conductors 43 and 42. This causes circuit to be established through the shading coil 48, and the motor M₂ is then actuated to move the control damper 33 toward its fully open position, until the air pressures in the chambers 6 and 7 become balanced again.

When the air pressures are balanced in the chambers 6 and 7, the diaphragm 35 will occupy its middle or neutral position, Fig. 5, so that the movable contact 36 is free of the stationary contacts 37 and 38. Neither of the shading coils 47 nor 48 will be energized at such time, and the motor M₂ will be stationary, holding the control damper 33 in the selected position.

In order to insure that the damper 33 will not be moved beyond its extreme open or closed positions, the motor M₂ may be provided with cam contacts 49 and 50 which are operated in such a manner that circuit will be broken to the particular shading coil 47 or 48 that is being utilized in a pressure-balancing operation, if the damper 33 should be moved to its extreme open or closed position during such operation.

Although I have shown my novel damper control arrangement as embodying an alternating current motor M₂, it will be manifest that a direct current reversing type motor could be equally well employed without departing from the spirit of my invention. Furthermore, if desired, the motor M₂ may be directly coupled to the control damper 33. However, the worm gear drive which I have disclosed has several advantages, namely, it causes the damper 33 to be actuated slowly and without jerking or hunting, thus insuring a maximum of precision in the automatic adjustment thereof by the motor and, because of the great mechanical advantage, it enables the motor to move the damper with ease and retain it in the proper position even though the air pressures on the damper are not balanced.

Inasmuch as the velocity of the air which is conveyed through the heating ducts 26 to the various rooms in the building is dependent upon the air pressures in the chambers 6 and 7 and since the air pressure in the tempering chamber 7 is maintained substantially constant relative to that in the hot air chamber 6, it follows that there will be no substantial change in the velocity of the air flowing through any of the ducts 26 when any of the respective mixing dampers 27 are actuated. This eliminates the uncomfortable change in draft which would otherwise be experienced in the corresponding rooms or areas upon a change in the constituency of the hot and tempered air mixture, thereby doing away with an outstanding disadvantage of prior heating systems.

While I have illustrated and described a selected embodiment of my invention it is to be understood that this is capable of variation and modification and I therefore do not wish to be limited to the precise details set forth but desire to avail myself of such changes and alterations as fall within the ambit of the following claims.

I claim:

1. In an air circulating system including at least two independent chambers to which air is supplied under pressure, a distributing duct in communication with all of said independent chambers, means controlling the communication between said independent chambers and said duct and operable to proportionate the volumes of air admitted into said duct from the respective chambers, means interposed between the source of air under pressure and at least one of said independent chambers and through which the air flows to have the temperature thereof varied, said air temperature-varying means resisting the flow of air into such chamber, means for regulating the rate at which air under pressure is supplied to other of said independent chambers and operable to regulate the air pressure in such chamber, and means responsive to a difference of air pressures in said independent chambers and operable to control operation of said regulating means to thereby establish uniform air pressures in said independent chambers and prevent undesired fluctuations in the rate of admission of air into said distributing duct from the respective chambers when said proportionating means is operated.

2. In an air circulating system including two independent chambers to which air is supplied under pressure, a distributing duct in communication with both of said independent chambers, means controlling the communication between said independent chambers and said duct and operable to proportionate the volumes of air admitted into said duct from the respective chambers, means interposed between the source of air under pressure and both of said independent chambers and through which the air flows to have the temperature thereof varied, said air temperature-varying means resisting the flow of air therethrough, means for regulating the rate at which air under pressure flows from the source thereof through said temperature-varying means and into one of said chambers and operable to regulate the air pressure in such chamber, further means interposed between the source of air under pressure and the other of said independent chambers and through which the air flows to have the temperature thereof varied, said further air temperature-varying means resisting the flow of air therethrough, and means responsive to a difference of air pressures in said independent chambers and operable to control operation of said regulating means to thereby establish uniform air pressures in said independent chambers and prevent undesired fluctuations in the rate of admission of air into said distributing duct from the respective chambers when said proportionating means is operated.

3. In an air circulating system including two independent chambers to which air is supplied under pressure, a distributing duct in communication with both of said independent chambers, means controlling the communication between said independent chambers and said duct and operable to proportionate the volumes of air admitted into said duct from the respective chambers, means controlling the flow of air under pressure directly from the source thereof to one of said chambers, means interposed between the source of air under pressure and both of said independent chambers and through which the air flows to have the temperature thereof varied, said air temperature-varying means resisting the flow of air therethrough, other means controlling the flow of air under pressure from the source thereof through said temperature-varying means and to said one of said chambers, further means interposed between the source of air under pressure and the other of said independent chambers and through which the air flows to have the temperature thereof varied, said further air temperature-varying means resisting the flow of air therethrough, further means for regulating the rate at which the air under pressure is admitted into the first-named of said chambers and operable to regulate the air pressure in such chamber, and means responsive to a difference of air pressures in said independent chambers and operable to control operation of said further regulating means to thereby establish uniform air pressures in said independent chambers and prevent undesired fluctuations in the rate of admission of air into said distributing duct from the respective chambers when said proportionating means is operated.

4. In an air circulating system including a hot air chamber and a tempered air chamber, both of said chambers being supplied with air under pressure, a distributing duct in communication with both of said chambers, means controlling the communication between said chambers and said duct and operable to proportionate the volumes of air admitted into said duct from the respective chambers, means controlling the flow of air under pressure directly from the source thereof to said tempered air chamber, a bank of heating elements interposed between the source of air under pressure and both of said chambers and through which the air flows to be heated, said bank of heating elements resisting the flow of air therethrough, other means controlling the flow of air under pressure from the source thereof through said bank of heating elements and to said tempered air chamber, a further bank of heating elements interposed between the source of air under pressure and said hot air chamber and through which the air flows to be heated, said further bank of heating elements resisting the flow of air therethrough, a control damper for regulating the admission of air under pressure into said tempered air chamber and operable to regulate the air pressure in such chamber, and means responsive to a difference of air pressures in said chambers and operable to control operation of said control damper to thereby establish uniform air pressures in said chambers and prevent undesired fluctuations in the rate of admission of air into said distributing duct from the respective chambers when said proportionating means is operated.

5. In an air circulating system including a hot air chamber and a tempered air chamber, both of said chambers being supplied with air under pressure, a distributing duct in communication with both of said chambers, means controlling the communication between said chambers and said duct and operable to proportionate the volumes of air admitted into said duct from the respective chambers, means controlling the flow of air under pressure directly from the source thereof to said tempered air chamber, a bank of heating elements interposed between the source of air under pressure and both of said chambers and through which the air flows to be heated, said bank of heating elements resisting the flow of air therethrough, other means controlling the flow of air under pressure from the source thereof through said bank of heating elements and to said tempered air chamber, a further bank of heating elements interposed between the source of air under pressure and said hot air chamber and through which the air flows to be heated, said further bank of heating elements resisting the flow of air therethrough, a control damper for regulating the admission of air under pressure into said tempered air chamber and operable to regulate the air pressure in such chamber, a motor for driving said control damper, and means responsive to a difference of air pressures in said chambers and operable to control operation of said motor whereby said control damper is operated to establish uniform air pressures in said chambers and prevent undesired fluctuations in the rate of admission of air into said distributing duct from the respective chambers when said proportionating means is operated.

6. In an air circulating system including a hot air chamber and a tempered air chamber, both of said chambers being supplied with air under pressure, a distributing duct in communication with both of said chambers, means controlling the communication between said chambers and said duct and operable to proportionate the volumes of air admitted into said duct from the respective chambers, means controlling the flow of air under pressure directly from the source thereof to said tempered air chamber, a bank of heating elements interposed between the source of air under pressure and both of said chambers and through which the air flows to be heated, said bank of heating elements resisting the flow of air therethrough, other means controlling the flow of air under pressure from the source thereof through said bank of heating elements and to said tempered air chamber, a further bank of heating elements interposed between the source of air under pressure and said hot air chamber and through which the air flows to be heated, said further bank of heating elements resisting the flow of air therethrough, a control damper for regulating the admission of air under pressure into said tempered air chamber and operable to regulate the air pressure in such chamber, a reversible motor for driving said control damper in either a forward or reverse direction, a circuit for enabling the operation of said motor in its forward direction, another circuit for enabling the operation of said motor in its reverse direction, and diaphragm means exposed on one side to the pressure of the air in said hot air chamber and on the other side to the pressure of the air in said tempered air chamber and responsive to a difference of air pressures to select and energize either of said circuits in accordance with which of the pressures is higher whereby said motor operates said control damper to establish uniform air pressures in said chambers and prevent undesired fluctuations in the rate of admission of air into said distributing duct from the respective chambers when said proportionating means is operated.

CHARLES T. DENKER.